June 29, 1965 H. E. RUEHLEMANN 3,192,498

CONTACT ADAPTED TO RECEIVE PIN OR PLATE

Filed May 17, 1962

INVENTOR.
HERBERT E. RUEHLEMANN
BY
Caesar and Rivise
ATTORNEYS.

United States Patent Office 3,192,498

Patented June 29, 1965

3,192,498

CONTACT ADAPTED TO RECEIVE PIN OR PLATE

Herbert E. Ruehlemann, Huntingdon Valley, Pa., assignor to Elco Corporation, Philadelphia, Pa., a corporation of Pennsylvania Filed May 17, 1962, Ser. No. 195,528
5 Claims. (Cl. 339—33)

This invention relates to a contact adapted to receive pin or plate and more particularly to a novel device of this character.

It is known to provide contacts in the nature of female contacts which receive an edge of a printed circuit board and thereby make direct electrical contact with one or more printed members of the printed circuit board.

An example of such a contact is disclosed and claimed in United States Patent No. 2,935,725. Another example of such a contact is disclosed and claimed in the applicant's co-pending application Serial No. 96,819, filed March 20, 1961, and entitled "Bellows Type Contact."

Such contacts generally comprise opposed resilient members between which the leading edge of the printed circuit board may be inserted thereby spreading the resilient members slightly apart and giving rise to a clamping compressive force being exerted upon the printed circuit board. This makes for better and more reliable contact between the printed circuit board and the contact.

It occasionally occurs that certain connections to the printed circuit board must be made by using a pin projecting therefrom. Sometimes, this connection can be made by using a rectangular pin which can be inserted in the same type of contact in which the edge of the printed circuit board is being received, thereby avoiding the expense and trouble of providing special contacts to receive the pins.

However, in certain applications, as for example, in a sealed header of a relay, it is necessary to use round pins because rectangular ones would set up undue stresses in the glass seal. If such a relay has to mate with a female contact, it has been necessary heretofore to provide a specially designed contact different from the board receiving contacts to receive the round pin of the relay, and to specially insert the contact in alignment with the contacts which receive an edge of the printed circuit board.

It is accordingly an object of the present invention to provide a female contact which is adapted to receive in good electrical contact either a plate, such as a printed circuit board, or a round pin.

A further object of the invention is to provide an extremely versatile contact of relatively low cost which can be quickly and easily secured into an operative position.

The foregoing as well as other objects of the invention are achieved by providing a contact including opposed wiping blades which are preferably bifurcated and which have on their interior surface inwardly projecting contact points which may receive and make contact with a plate or a pin.

Other objects and many of the attendant advantages of this invention will be readily appreciated as the same becomes better understood by reference to the following detailed description when considered in connection with the accompanying drawings wherein.

Referring now in greater detail to the various figures of the drawings wherein similar reference characters refer to similar parts, a contact adapted to receive pin or plate embodying the present invention is generally shown at 10 in FIG. 1.

Figure 1:
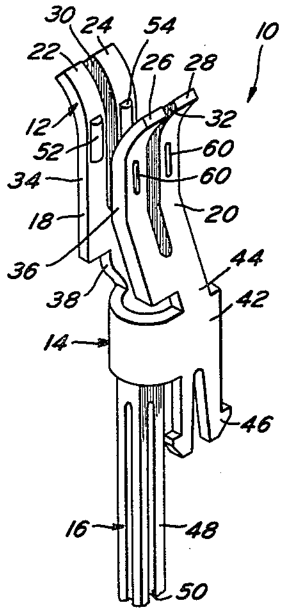
FIG. 1 is a perspective view of a contact constituting a first embodiment of the present invention.

Contact 10 basically comprises a mating section 12, a body section 14 and a tail section 16.

The mating section 12 generally includes elongated opposed resilient wiping arms 18 and 20. Each of the arms 18 and 20 are preferably bifurcated with the arm 18 including fingers 22 and 24 and the arm 20 including fingers 26 and 28. The fingers 22 and 24 are separated by a slot 30 and the fingers 26 and 28 are separated by a slot 32.

The arms 18 and 20 include central sections 34 and 36 which are generally parallel to each other. The central sections taper outwardly and away from each other in order to act as guides for a plate or a pin being inserted between the arms 18 and 20.

Figure 2:
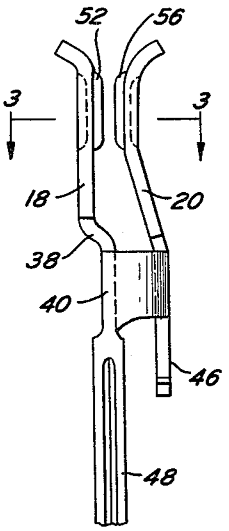
FIG. 2 is a side elevational view of the contact of FIG. 1.

As shown in FIG. 2, the lower portion of the arm 18 proceeds downwardly and inwardly to a short offset section 38 which merges into a bridging section 40. The bridging section 40 is a component part of the body section 14 and is in the nature of a U-shaped member and makes a complete 180° turn to provide an opposed arm 42 from which a connecting section 44 arises to merge into the arm 20. A bifurcated locking lance 46 depends from the opposed arm 42 for the purpose of securing the contact 10 in an insulating casing (not shown).

The tail section 16 includes a long shank 48 which is basically square in cross section with sharp corners in order to be usable with automatic wrap wire machines. The shank 48 includes indentations 50 which are formed during the cold working of the shank 48 as described and claimed in U.S. application Serial No. 103,745, filed April 18, 1961, and entitled "Method of Forming Rigid Contact Tails" and now U.S. Patent No. 3,142,891.

Figure 3:
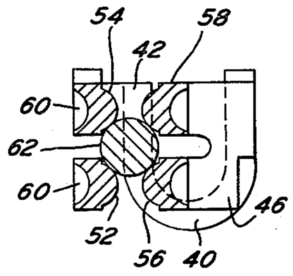
FIG. 3 is an enlarged, sectional view taken along the lines 3—3 of FIG. 2 with a pin inserted therein.

Each of the fingers 22, 24, 26 and 28 of the wiping arms 18 and 20 has formed therein respectively on their respective interior surfaces inwardly facing, longitudinally elongated opposed spaced convex projections 52, 54, 56 and 58. As best indicated in FIGS. 2 and 3, the contact projections are arcuate in cross-section and are formed by a die or by other suitable apparatus in such a manner that the force of the die in creating the contact projections is such as to cause the metal to flow inwardly thereby leaving identations 60 in the outer surfaces of the contact fingers.

It is thus seen that contact projection 52 opposes contact point 56 and contact projection 54 opposes contact projection 58. The four contact projections are so disposed as indicated in FIG. 3 that a pin 62 may be inserted therebetween. The contact projections are slightly closer to each other than the diameter of the pin 62 so that when the pin 62 has to be forced somewhat between the contact projections thereby giving rise to a compressive force being exerted on the pin 62 to hold the same in position. As indicated in FIG. 3, the pin 62 makes tangential contact with each of the contact projections 52, 54, 56 and 58. There is thus established a line contact at four points between the pin 62 and the contact 10. It follows that where necessary a rectangular plate may be inserted between the wiping arms 18 and 20 instead of the pin 62. As indicated in FIG. 3, the contact projections 52, 54, 56 and 58 possess convex surfaces which face each other in respective pairs and the indentations 60 are generally concave. The wiping arms 18 and 20 are preferably bifurcated to provide additional resiliency. It is thus seen that the contact projections are so shaped as to engage a longitudinally inserted pin in line contact between said projections and said pin, and that the contact projections are so shaped to engage a surface of a longitudinally inserted plate in line contact, thereby stabilizing the overall contact construction.

Figure 4:
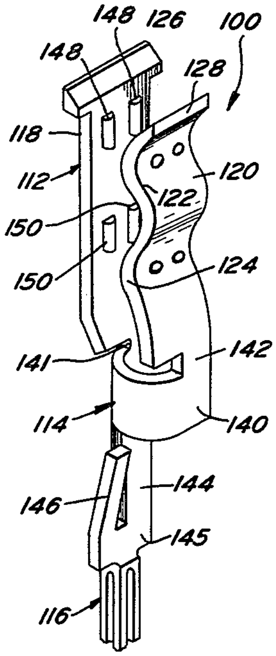
FIG. 4 is a fragmentary perspective view of another embodiment of the present invention.

Another embodiment of the present invention is shown at 100 in FIG. 4 and like the embodiment 10 is manufactured from copper or other good conducting material. The stock from which the contacts 10 and 100 are stamped is of the order of 0.022 inch in thickness.

The contact 100 basically comprises a mating section 112, a body section 114 and a tail section 116.

The mating section 112 includes opposed, resilient wiping arms 118 and 120. The wiping arm 118 is generally planar whereas the wiping arm 120 includes several corrugations to enhance the resiliency thereof including contact areas 122 and 124 which lie closest to the wiping arm 118. Both the wiping arms 118 and 120 include at their extreme tips outwardly inclined areas 126 and 128 to guide the insertion of a pin or plate. The wiping arms 118 and 120 merge into a bridging section 140 which is a component part of the body section 114. The bridging section 140 is in the nature of a U-shaped member and makes a complete 180° turn to provide a base from which sections 141 and 142 rise to merge respectively into the wiping arms. A shank 144 depends from one side of the bridging section 140 and merges into a perpendicular arm 145 from which the tail section 116 depends. A locking lance 146 projects upwardly from the arm 145 for the purpose of securing the contact 100 in an insulating casing (not shown). The tail section 116 is similar to the tail section 16 as described hereinabove.

Figure 5:
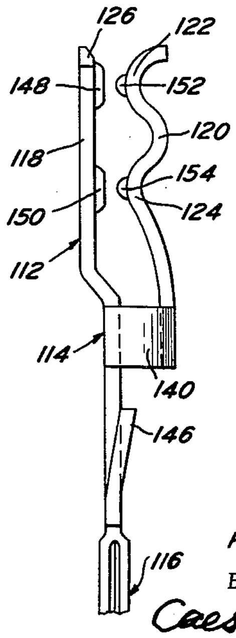
FIG. 5 is a side elevational view of the entire contact of FIG. 4.
Figure 6:
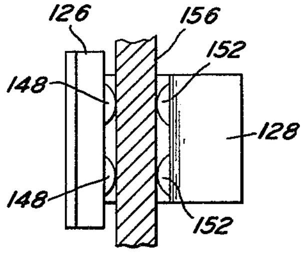
FIG. 6 is a top plan view of the entire contact of FIG. 4 showing a plate inserted therein.
Figure 7:
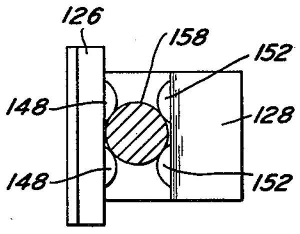
FIG. 7 is a view similar to FIG. 6 but showing a pin inserted therein.

As indicated in FIGS. 6 and 7, the wiping arm 118 has formed therein on its interior surface inwardly facing opposed pairs of upper contact projections 148 and lower contact projections 150. The wiping arm 120 has formed therein on its interior surface inwardly facing pairs of opposed upper contact projections 152 and lower contact points 154. The contact projections 152 are so shaped to provide points of contact with a pin or plate and are formed in the contact area 122 and the contact projections 154 are formed in the contact area 124. The pair of upper contact projections 148 is opposed to the pair of upper contact projections 152 and the pair of lower contact projections 150 is opposed to the contact projections 154. The respective contact projections are formed in a manner similar to the contact projections of the device of FIG. 1. As shown in FIG. 5, the contact projections 148 and 150 are louvers and contact projections 152 and 154 are dimples.

The use of the contact 100 with a pin or plate is illustrated in FIGS. 6 and 7. In FIG. 6 a plate 156, such as a printed circuit board is inserted between the contact projections, and in FIG. 7 a pin 158 is inserted between the very same contact projections. As indicated in FIG. 6, the plate 156 makes tangential contact with each of the contact projections at the innermost projections of the contact projections. As shown in FIG. 7, the pin 158 makes tangential contact with the contact projections at points somewhat closer to the wiping arms.

The wiping arms are spaced a bit closer to each other than the thickness or diameter of the plates or pins to be used in connection with the contact 100 in order to achieve a clamping action on the plate or pin as previously described in connection with the contact 10.

Obviously many modifications and variations of the present invention are possible in the light of the above teachings. It is, therefore, to be understood that within the scope of the appended claims, the invention may be practiced otherwise than as specifically described.

What is claimed as the invention is:

1. A contact comprising a mating section, a body section and a tail section depending therefrom, said mating section including elongated opposed wiping blades, at least one of said wiping blades having formed thereon spaced convex longitudinally elongated contact projections extending from the interior surface thereof, said contact projections being arcuate in cross-section and defining between them an area adapted to receive a pin or a plate, the other wiping blade having projections formed thereon shaped to provide points of contact with the pin or plate, said wiping blades being spaced relatively close to each other so as to be forced apart by a longitudinally inserted pin or plate whereby a resilient grip is exerted upon said pin or plate, said contact projections being so shaped as to engage a longitudinally inserted pin in line contact between said projections and said pin, and engaging a surface of a longitudinally inserted plate in line contact, thereby stabilizing the overall contact construction.

2. A contact comprising a mating section, a body section and a tail section depending therefrom, said mating section including opposed wiping blades, at least one of said wiping blades having formed thereon spaced convex contact projections extending inwardly from the interior surface thereof, said contact projections defining between them an area adapted to receive a pin or a plate, the other wiping blade having contact projections formed thereon, said wiping blades being spaced relatively close to each other so as to be forced apart by said pin or plate whereby a resilient grip is exerted upon said pin or plate, said wiping blades being bifurcated into fingers, each of said fingers including at least one of said contact projections, each of said projections being so shaped as to engage a surface portion of the inserted pin or plate.

3. The invention of claim 1 wherein each of said projections is convex.

4. The invention of claim 3 wherein said projections are so shaped as to make four line contacts with the inserted pin or plate.

5. The invention of claim 1 wherein said opposed wiping blades each include two pairs of spaced contact projections.

References Cited by the Examiner

UNITED STATES PATENTS

| | | | |
|---|---|---|---|
| 838,260 | 12/06 | Manson | 339—253 |
| 1,369,221 | 2/21 | Currier | 339—258 |
| 2,743,428 | 4/56 | Martines | 339—256 X |
| 2,825,042 | 2/58 | Tollefson et al. | 339—17 |
| 2,853,689 | 9/58 | Jackson et al. | 339—17 |
| 2,965,872 | 12/60 | Linn | 339—198 |

FOREIGN PATENTS

| | | |
|---|---|---|
| 783,620 | 9/57 | Great Britain. |
| 882,698 | 11/61 | Great Britain. |
| 936,164 | 2/48 | France. |
| 1,073,818 | 3/54 | France. |

JOSEPH D. SEERS, *Primary Examiner.*

THOMAS J. HICKEY, *Examiner.*